United States Patent
Chakraborty et al.

(10) Patent No.: US 9,670,065 B2
(45) Date of Patent: Jun. 6, 2017

(54) METHODS OF FORMING GRAPHENE-COATED DIAMOND PARTICLES AND POLYCRYSTALLINE COMPACTS

(71) Applicant: Baker Hughes Incorporated, Houston, TX (US)

(72) Inventors: Soma Chakraborty, Houston, TX (US); Anthony A. DiGiovanni, Houston, TX (US); Gaurav Agrawal, Aurora, CO (US); Danny E. Scott, Montgomery, TX (US); Vipul Mathur, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 49 days.

(21) Appl. No.: 14/819,031

(22) Filed: Aug. 5, 2015

(65) Prior Publication Data
US 2015/0336801 A1 Nov. 26, 2015

Related U.S. Application Data

(62) Division of application No. 13/283,021, filed on Oct. 27, 2011, now Pat. No. 9,103,173.
(Continued)

(51) Int. Cl.
*B24B 1/00* (2006.01)
*B24D 11/00* (2006.01)
(Continued)

(52) U.S. Cl.
CPC .............. *C01B 31/065* (2013.01); *B05D 1/36* (2013.01); *B05D 7/5483* (2013.01);
(Continued)

(58) Field of Classification Search
None
See application file for complete search history.

(56) References Cited

U.S. PATENT DOCUMENTS

| | | | |
|---|---|---|---|
| 3,745,623 | A | 7/1973 | Wentorf et al. |
| 4,220,455 | A | 9/1980 | St. Pierre et al. |

(Continued)

FOREIGN PATENT DOCUMENTS

| | | |
|---|---|---|
| CN | 101263083 A | 9/2008 |
| CN | 101324175 A | 12/2008 |

(Continued)

OTHER PUBLICATIONS

Hwang, Kuo Chu et al., "Facile Surface Functionalization of Nanodiamonds", American Chemical Society/Langmuir 26 (5) (2010) pp. 3685-3689.
(Continued)

*Primary Examiner* — Kaj K Olsen
*Assistant Examiner* — Ross J Christie
(74) *Attorney, Agent, or Firm* — TraskBritt

(57) ABSTRACT

Coated diamond particles have solid diamond cores and at least one graphene layer. Methods of forming coated diamond particles include coating diamond particles with a charged species and coating the diamond particles with a graphene layer. A composition includes a substance and a plurality of coated diamond particles dispersed within the substance. An intermediate structure includes a hard polycrystalline material comprising a first plurality of diamond particles and a second plurality of diamond particles. The first plurality of diamond particles and the second plurality of diamond particles are interspersed. A method of forming a polycrystalline compact includes catalyzing the formation
(Continued)

of inter-granular bonds between adjacent particles of a plurality of diamond particles having at least one graphene layer.

10 Claims, 6 Drawing Sheets

Related U.S. Application Data

(60) Provisional application No. 61/408,382, filed on Oct. 29, 2010.

(51) Int. Cl.

| | |
|---|---|
| *C01B 31/06* | (2006.01) |
| *B05D 1/36* | (2006.01) |
| *B05D 7/00* | (2006.01) |
| *B22F 1/02* | (2006.01) |
| *E21B 10/567* | (2006.01) |
| *C04B 35/00* | (2006.01) |
| *C22C 26/00* | (2006.01) |
| *C04B 35/52* | (2006.01) |
| *C04B 35/628* | (2006.01) |
| *B22F 5/00* | (2006.01) |

(52) U.S. Cl.
CPC .............. *B05D 7/5883* (2013.01); *B22F 1/02* (2013.01); *B22F 1/025* (2013.01); *C04B 35/00* (2013.01); *C04B 35/52* (2013.01); *C04B 35/62839* (2013.01); *C22C 26/00* (2013.01); *E21B 10/567* (2013.01); *B22F 2005/001* (2013.01); *B22F 2998/00* (2013.01); *C04B 2235/427* (2013.01)

(56) References Cited

U.S. PATENT DOCUMENTS

| | | | |
|---|---|---|---|
| 4,960,643 | A | 10/1990 | Lemelson |
| 5,127,923 | A | 7/1992 | Bunting et al. |
| 5,151,107 | A | 9/1992 | Cho et al. |
| 5,759,216 | A | 6/1998 | Kanada et al. |
| 5,766,394 | A | 6/1998 | Anderson et al. |
| 5,954,147 | A | 9/1999 | Overstreet et al. |
| 6,372,002 | B1 | 4/2002 | D'Evelyn et al. |
| 8,020,621 | B2 | 9/2011 | DiFoggio et al. |
| 2004/0110005 | A1 | 6/2004 | Choi et al. |
| 2004/0136892 | A1 | 7/2004 | Davies et al. |
| 2004/0141865 | A1 | 7/2004 | Keshavan et al. |
| 2007/0056778 | A1 | 3/2007 | Webb et al. |
| 2008/0073126 | A1 | 3/2008 | Shen et al. |
| 2008/0085407 | A1 | 4/2008 | Cooley et al. |
| 2008/0127475 | A1 | 6/2008 | Griffo |
| 2008/0202821 | A1 | 8/2008 | McClain et al. |
| 2008/0302579 | A1 | 12/2008 | Keshavan et al. |
| 2009/0139698 | A1 | 6/2009 | Robinson |
| 2009/0218276 | A1 | 9/2009 | Linford et al. |
| 2009/0277839 | A1 | 11/2009 | Linford |
| 2009/0297854 | A1 | 12/2009 | Lee et al. |
| 2010/0123746 | A1 | 5/2010 | Wu |
| 2010/0151318 | A1 | 6/2010 | Lopatin et al. |
| 2010/0203391 | A1 | 8/2010 | Lopatin et al. |
| 2010/0213131 | A1 | 8/2010 | Linford et al. |
| 2010/0230174 | A1 | 9/2010 | Scott et al. |
| 2011/0031034 | A1 | 2/2011 | DiGiovanni et al. |
| 2011/0061942 | A1 | 3/2011 | DiGiovanni |
| 2011/0200825 | A1 | 8/2011 | Chakraborty et al. |
| 2012/0037431 | A1 | 2/2012 | DiGiovanni et al. |
| 2012/0102843 | A1 | 5/2012 | Chakraborty et al. |
| 2012/0202067 | A1 | 8/2012 | Chakraborty et al. |
| 2012/0324799 | A1 | 12/2012 | Chakraborty et al. |

FOREIGN PATENT DOCUMENTS

| | | |
|---|---|---|
| CN | 101428786 A | 5/2009 |
| CN | 101463472 A | 6/2009 |
| CN | 101469417 A | 7/2009 |
| CN | 101772615 A | 7/2010 |
| WO | 2004040029 A1 | 5/2004 |

OTHER PUBLICATIONS

Kuznetsov, V. L. et al. "Electrical resistivity of graphitized ultradisperse diamond and onion-like carbon" Chem. Phys. Letters 336 (Mar. 23, 2001) pp. 397-404.

Lee et al., Layer-by-Layer Assembly of All Carbon Nanotube Ultrthin Films for Electrochemical Applications, Jourtnal of the American Chemical Society (2009), Vo. 131, No. 2, pp. 671-679.

International Preliminary Report on Patentability and Written Opinion of the International Searching Authority for PCT/US2011/058057, dated Jul. 12, 2012, 5 pages.

International Search Report of the International Searching Authority for PCT/US2011/058057, dated Apr. 30, 2013, 4 pages.

International Written Opinion of the International Searching Authority for PCT/US2011/058057, dated Apr. 30, 2013, 4 pages.

Saini et al., Core Shell Diamond as a Support for Solid Phase Extraction and High Performance Liquid Chromatigraphy, 82 Analytical Chem. 4448 (Jun. 1, 2010), pp. 4448-4456.

Struers, DiaDuo-2 diamond suspension and cooling lubricant, http://www.struers.com/default.asp?top_id=2&main_id=58 &doc_id=506 , visited Oct. 6, 2010, 1 page.

Stuers, Dia Duo Brochure, http://www.struers.com/resources/elements/12/164618/DiaDuo-2_BrochureEnglish.pdf , visited Oct. 6, 2010, 2 pages.

European Office Action for European Application No. 11837077.4 dated Feb. 14, 2017, 7 pages.

Tong et al., Graphene Based Materials and Thier Composites as Coatings, Austin Jounal of Nanomedicine & Nanotechnology, vol. 1, Issue 1, (2013), 16 pages.

METHODS OF FORMING GRAPHENE-COATED DIAMOND PARTICLES AND POLYCRYSTALLINE COMPACTS

CROSS-REFERENCE TO RELATED APPLICATIONS

This application is a divisional of U.S. patent application Ser. No. 13/283,021, filed Oct. 27, 2011, now U.S. Pat. No. 9,103,173, issued Aug. 11, 2015, which application claims the benefit of U.S. Provisional Patent Application Ser. No. 61/408,382, filed Oct. 29, 2010, titled "Graphene-Coated Diamond Particles, Polycrystalline Compacts, Drill Bits, and Compositions of Graphene-Coated Diamond Particles, and Methods of Forming Same," the disclosure of each of which is incorporated herein in its entirety by this reference. The subject matter of this application is also related to the subject matter of U.S. patent application Ser. No. 13/166,557, filed Jun. 22, 2011, now U.S. Pat. No. 8,840,693, issued Sep. 23, 2014.

FIELD

Embodiments of the present disclosure relate generally to coated diamond particles, which may be used in, by way of non-limiting example, fluid suspensions, polymers, elastomers, polycrystalline compacts, and earth-boring tools, and to methods of forming such diamond particles.

BACKGROUND

Diamond crystals are useful in various industrial applications. For example, diamond grains may be used in surface polishing, in the manufacture of drill bits, and as conductive filler materials for polymers and elastomers. Liquid suspensions of diamond grains may be used for lubrication, thermal management, or grinding.

Cutting elements used in earth-boring tools often include polycrystalline diamond compact (often referred to as "PDC") cutting elements, which are cutting elements that include cutting faces of a polycrystalline diamond material. Polycrystalline diamond material is material that includes inter-bonded grains or crystals of diamond material. In other words, polycrystalline diamond material includes direct, inter-granular bonds between the grains or crystals of diamond material. The terms "grain" and "crystal" are used synonymously and interchangeably herein.

Polycrystalline diamond compact cutting elements are formed by sintering and bonding together relatively small diamond grains under conditions of high temperature and high pressure in the presence of a catalyst (for example, cobalt, iron, nickel, or alloys or mixtures thereof) to form a layer or "table" of polycrystalline diamond material on a cutting element substrate. These processes are often referred to as high-temperature/high-pressure (or "HTHP") processes. The cutting element substrate may comprise a cermet material (i.e., a ceramic-metal composite material) such as cobalt-cemented tungsten carbide. In such instances, the cobalt or other catalyst material in the cutting element substrate may diffuse into the diamond grains during sintering and serve as the catalyst material for forming the inter-granular diamond-to-diamond bonds, and the resulting diamond table, from the diamond grains. In other methods, powdered catalyst material may be mixed with the diamond grains prior to sintering the grains together in an HTHP process. Methods of forming polycrystalline compacts with interstitial materials are described in U.S. Patent Application Publication No. 2011/0061942 A1, "Polycrystalline Compacts Having Material Disposed in Interstitial Spaces Therein, Cutting Elements and Earth-Boring Tools Including Such Compacts, and Methods of Forming Such Compacts," published Mar. 17, 2011, the disclosure of which is incorporated herein in its entirety by this reference.

Upon formation of a diamond table using an HTHP process, catalyst material may remain in interstitial spaces between the grains of diamond in the resulting polycrystalline diamond table. The presence of the catalyst material in the diamond table may contribute to thermal damage in the diamond table when the cutting element is heated during use, due to friction at the contact point between the cutting element and the rock formation being cut.

PDC cutting elements in which the catalyst material remains in the diamond table are generally thermally stable up to a temperature of about seven hundred fifty degrees Celsius (750° C.), although internal stress within the cutting element may begin to develop at temperatures exceeding about four hundred degrees Celsius (400° C.) due to a phase change that occurs in cobalt at that temperature (a change from the "beta" phase to the "alpha" phase). Also beginning at about four hundred degrees Celsius (400° C.), there is an internal stress component that arises due to differences in the thermal expansion of the diamond grains and the catalyst at the grain boundaries. This difference in thermal expansion may result in relatively large tensile stresses at the interface between the diamond grains, and contributes to thermal degradation of the microstructure when PDC cutting elements are used in service. Differences in the thermal expansion between the diamond table and the cutting element substrate to which it is bonded may further exacerbate the stresses in the PDC cutting element. This differential in thermal expansion may result in relatively large compressive and/or tensile stresses at the interface between the diamond table and the substrate that eventually lead to the deterioration of the diamond table, cause the diamond table to delaminate from the substrate, or result in the general ineffectiveness of the cutting element.

Furthermore, at temperatures at or above about seven hundred fifty degrees Celsius (750° C.), some of the diamond crystals within the diamond table may react with the catalyst material causing the diamond crystals to undergo a chemical breakdown or conversion to another allotrope of carbon. For example, the diamond crystals may graphitize at the diamond crystal boundaries, which may substantially weaken the diamond table. Also, at extremely high temperatures, in addition to graphite, some of the diamond crystals may be converted to carbon monoxide and/or carbon dioxide.

In order to reduce the problems associated with differences in thermal expansion and chemical breakdown of the diamond crystals in polycrystalline diamond cutting elements, so-called "thermally stable" polycrystalline diamond compacts (which are also known as thermally stable products, or "TSPs") have been developed. Such a thermally stable polycrystalline diamond compact may be formed by leaching the catalyst material (e.g., cobalt) out from interstitial spaces between the inter-bonded diamond crystals in the diamond table using, for example, an acid or combination of acids (e.g., aqua regia). A substantial amount of the catalyst material may be removed from the diamond table, or catalyst material may be removed from only a portion thereof. Thermally stable polycrystalline diamond compacts in which substantially all catalyst material has been leached out from the diamond table have been reported to be thermally stable up to temperatures of about twelve hundred degrees Celsius (1,200° C.). It has also been reported, however, that such fully leached diamond tables are relatively more brittle and vulnerable to shear, compressive, and tensile stresses than are non-leached diamond tables. In addition, it is difficult to secure a completely leached diamond table to a supporting substrate. In an effort to provide cutting elements having diamond tables that are more thermally stable relative to non-leached diamond tables, but that are also relatively less brittle and vulnerable to shear, compressive, and tensile stresses relative to fully leached diamond tables, cutting elements have been provided that include a diamond table in which the catalyst material has been leached from a portion or portions of the diamond table. For example, it is known to leach catalyst material from the cutting face, from the side of the diamond table, or both, to a desired depth within the diamond table, but without leaching all of the catalyst material out from the diamond table.

DISCLOSURE

In some embodiments of the disclosure, a coated diamond particle has a solid core comprising diamond and at least one graphene layer over at least a portion of the solid core.

A method of forming a coated diamond particle includes coating a diamond particle with a charged species and coating the diamond particle with a graphene layer.

In some embodiments, a composition includes a substance and a plurality of coated diamond particles dispersed within the substance. Each coated diamond particle has a diamond core and at least one graphene layer formed or otherwise provided over at least a portion of the diamond core.

An intermediate structure including a hard polycrystalline material comprises a first plurality of diamond particles and a second plurality of diamond particles. At least one of the first plurality of diamond particles and the second plurality of diamond particles comprises a plurality of diamond particles having at least one graphene layer. The first plurality of diamond particles and the second plurality of diamond particles are interspersed.

A method of forming a polycrystalline compact includes coating each of a plurality of diamond particles with at least one graphene layer and catalyzing the formation of inter-granular bonds between adjacent particles of the plurality of diamond particles.

BRIEF DESCRIPTION OF THE DRAWINGS

While the specification concludes with claims particularly pointing out and distinctly claiming what are regarded as embodiments of the disclosure, various features and advantages of embodiments of the disclosure may be more readily ascertained from the following description of some embodiments when read in conjunction with the accompanying drawings, in which:

DETAILED DESCRIPTION

Figure 1:
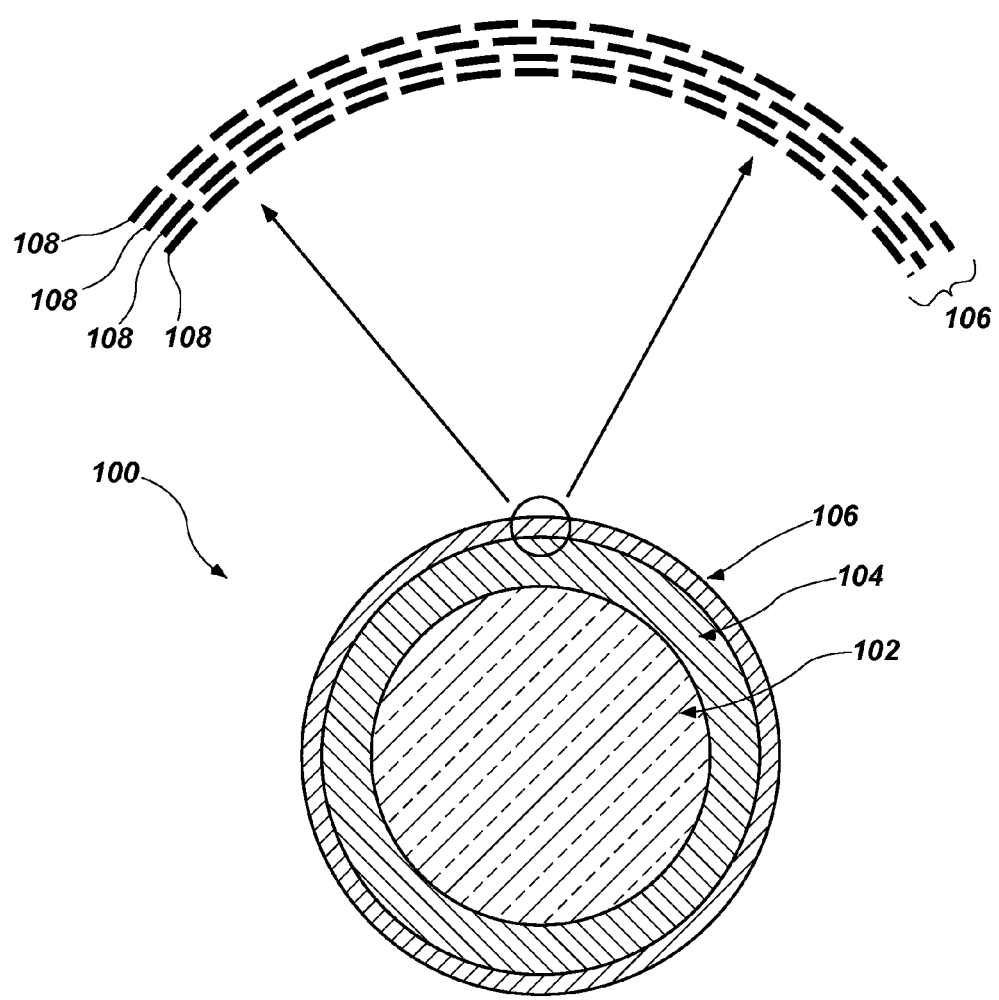
FIGS. 1 through 4 illustrate embodiments of coated diamond particles.

The illustrations presented herein are not actual views of any particular particles, polycrystalline compact, microstructure of polycrystalline material, or drill bit, and are not drawn to scale, but are merely idealized representations employed to describe the present disclosure. Additionally, elements common between figures may retain the same numerical designation.

As used herein, the term "drill bit" means and includes any type of bit or tool used for drilling during the formation or enlargement of a wellbore and includes, for example, rotary drill bits, percussion bits, core bits, eccentric bits, bicenter bits, reamers, expandable reamers, mills, drag bits, roller cone bits, hybrid bits, and other drilling bits and tools known in the art.

As used herein, the term "particle" means and includes any coherent volume of solid matter having an average dimension of about 2 mm or less. Grains (i.e., crystals) and coated grains are types of particles. As used herein, the term "nanoparticle" means and includes any particle having an average particle diameter of about 500 nm or less. The term "nanodiamond" means and includes nanoparticles of diamond material, that is, diamond grains having an average particle diameter of about 500 nm or less. As used herein, the term "micron diamond" means and includes diamond grains in a range from about 1 μm to about 500 μm. The term "submicron diamond" means and includes diamond grains in a range from about 500 nm to about 1 μm.

The term "polycrystalline material" means and includes any material comprising a plurality of grains (i.e., crystals) of the material that are bonded directly together by inter-granular bonds. The crystal structures of the individual grains of the material may be randomly oriented in space within the polycrystalline material.

As used herein, the term "inter-granular bond" means and includes any direct atomic bond (e.g., covalent, metallic, etc.) between atoms in adjacent grains of material.

As used herein, the term "formed over" means and includes formed on, over, and/or around a material. A material may be formed over (that is, on, over, and/or around) another material by depositing, growing, or otherwise providing a layer of source material on, over, and/or around the another material. The particular process used to deposit each layer will depend upon the particular material composition of that layer, the composition of the another material, the geometry of the another material and the layer, etc. Many suitable processes for depositing such layers are known in the art including, for example, wet chemistry processes (e.g., dip coating, solid-gel processes, etc.), physical deposition processes (e.g., sputtering, also known as physical vapor deposition (PVD), etc.), and chemical deposition processes (e.g., chemical vapor deposition (CVD), atomic layer deposition (ALD), etc.), or combinations thereof. In some embodiments, the layer of source material may be provided over the another material in a fluidized bed reactor, which may also be combined with one or more of the aforementioned techniques.

As used herein, the term "functionalized," when referring to a surface, means and includes a surface to which a material (i.e., a functional group) has been added by chemical interaction (e.g., bonding). Virtually any organic compound may be added to a surface. A surface may be functionalized to achieve any desired surface property, such as hydrophilicity, hydrophobicity, reactivity with selected chemical species, etc.

FIG. 1 is a simplified cross-section of an embodiment of a coated diamond particle 100 with a core 102 and an outer layer 106 comprising graphene. The core 102 of the coated diamond particle 100 may comprise micron diamond, submicron diamond, nanodiamond, or any other diamond particle. The core 102 may be formed by any method known in the art, such as by a detonation synthesis process, commonly used to form nanodiamond. A carbon shell 104, which may be a layer of carbon, commonly referred to in the art as a "carbon onion," may be formed over the core 102. The carbon shell 104 may be formed during the formation of the core 102 or by heating the core 102 to a high temperature for a period of time in which an outer shell of the core 102 may change from a crystalline structure to a non-crystalline structure. For example, the core 102 may be heated to more than about 800° C., for more than about 30 minutes. The carbon shell 104 may be graphite or a graphene-based structure. The carbon shell 104 may provide reactive sites to which the outer layer 106 may attach.

The surface of the carbon shell 104 may be chemically modified by coating it with a charged species, such as a positively charged amine-terminated group (e.g., a branched-polyethyleneimine (B-PEI)). The carbon shell 104 may then be immersed in a solution containing an oppositely charged species (e.g., a polyacrylic acid or a negatively charged graphene entity). The charged species may be a transient coating, configured to enable adherence of graphene layers 108. In some embodiments, the charged species may be a permanent coating that becomes integrated into outer layer 106.

Figure 2:
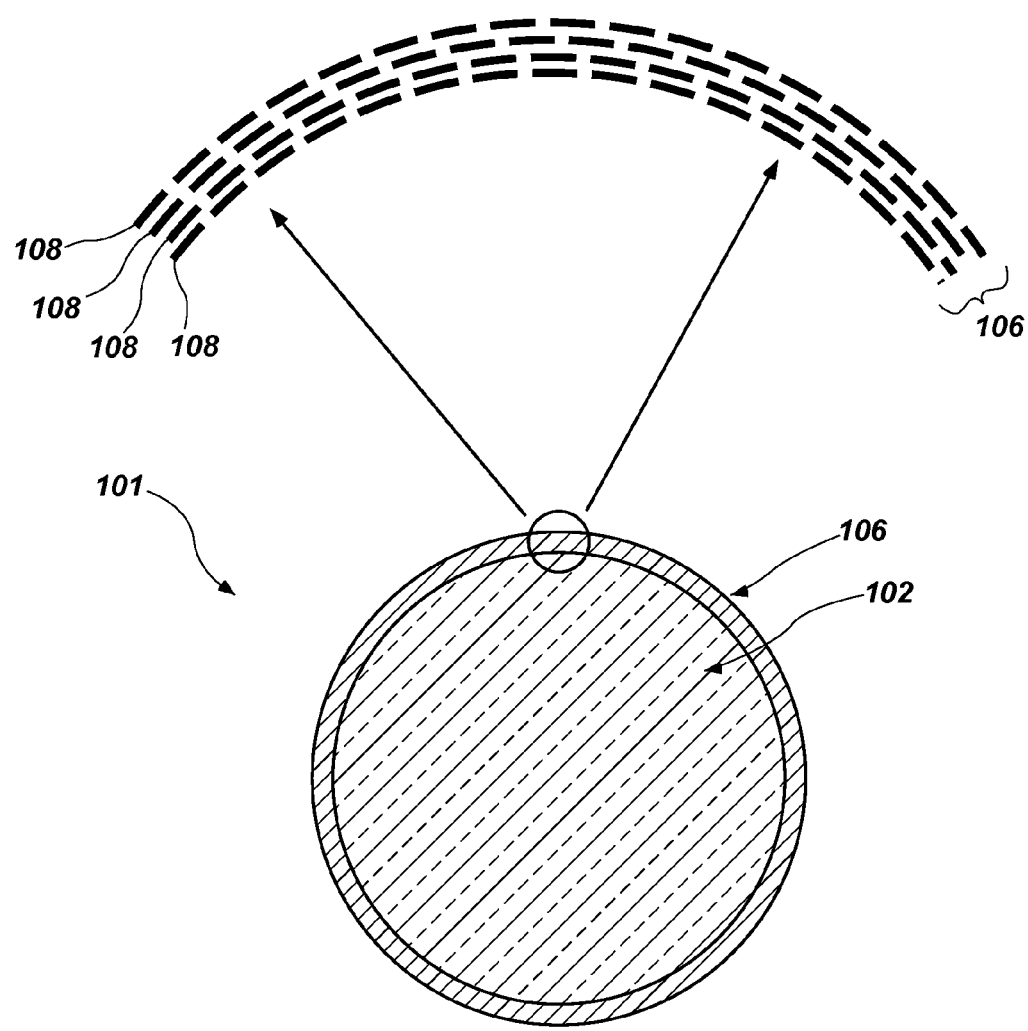

In some embodiments, shown as coated diamond particle 101 in FIG. 2, the carbon shell 104 may be omitted. The surface of the core 102 may be chemically modified by attaching a reactive group to the core 102, such as an acid group, an epoxy group, a hydroxyl group, etc. The reactive group may provide reactive sites or anchors to which the outer layer 106 may attach.

An outer layer 106 may be formed over the core 102 or the carbon shell 104 (FIG. 1). The outer layer 106 may comprise graphene layers 108. The first graphene layer 108 (i.e., the graphene layer with the smallest inside diameter) may be formed over the core 102 or the carbon shell 104, and each successive graphene layer 108 may be formed over a previously formed graphene layer 108. The coated diamond particle 100 or 101 may be chemically modified by coating it with a charged species. The coated diamond particle 100 or 101 may then optionally be immersed in a solution containing an oppositely charged species. A graphene layer 108 may then be formed over the charged species or over the oppositely charged species on the surface of the coated diamond particle 100 or 101. The graphene layer 108 may be positively charged, negatively charged, or uncharged. The process may be repeated any number of times, with graphene layers 108 being formed over a core 102, a carbon shell 104, previously formed graphene layers 108, and/or a charged species. Methods of forming graphene layers on substrates are described in U.S. Patent Application Publication No. 2011/0200825 A1, titled "Nano-Coatings for Articles," published Aug. 18, 2011, the disclosure of which is incorporated herein in its entirety by this reference. The methods described therein may be used as described herein to apply graphene layers to particles. Methods of depositing nanodiamond layer-by-layer onto diamond particles have been described in Gaurav Saini et al., *Core-Shell Diamond as a Support for Solid-Phase Extraction and High-Performance Liquid Chromatography*, 82 ANAL. CHEM. 4448-56 (2010), the disclosure of which is incorporated herein in its entirety by this reference.

In some embodiments, outer layer 106 may be formed over only a portion of the carbon shell 104, or over only a portion of the core 102. In such embodiments, a partially coated diamond particle may be formed. In other embodiments, some graphene layers 108 may be formed over the entire carbon shell 104 or core 102, while others may be formed over only a portion of the carbon shell 104 or core 102.

Multiple graphene layers 108 may be formed such that the coated diamond particle 100 or 101 exhibits selected values for one or more selected physical properties, such as diameter, thickness of outer layer 106, electrical conductivity, thermal conductivity, mechanical strength, coefficient of thermal expansion, wettability, mass, geometry, surface energy, specific surface area, etc. For example, the specific surface area of coated diamond particles 100 or 101 may be from about 10 $m^2/g$ to about 2200 $m^2/g$ (as determined by, e.g., a gas adsorption measurement). Coated diamond particles 100 or 101 may have the unique features associated with diamond particles, such as hardness and thermal conductivity, plus features of a graphene coating, such as wettability. When the coated diamond particles 100 or 101 are used in suspensions or solids, the coated diamond particles 100 or 101 may change some physical properties of the suspensions or solids. For example, the thermal conductivity, mechanical strength, and electrical conductivity of a fluid or solid may be increased by suspending graphene-coated diamond particles therein.

Features such as wettability may be particularly valuable in liquids, such as lubricating oils. High thermal conductivity may be an important feature for oils used in motors and pumps because, in such applications, heat must be removed from operating components. Diamond particles in suspension, with their high thermal conductivity, may therefore be an attractive additive. Unfortunately, uncoated diamond particles may settle quickly from oil, because diamond has poor wettability in oil. Rapid settling may make diamond grains impractical for use in oils because the grains must be redispersed to ensure proper lubrication. In pumps and motors, there may be no convenient way to effect such redispersion before startup. Graphene may limit the settling problem because if properly functionalized, it may have higher wettability in oil than diamond does. By coating diamond grains with graphene, the beneficial features of both materials may be combined. It may be possible to keep coated diamond particles 100 or 101 in suspension much longer than uncoated diamond particles. Because they may remain in suspension, coated diamond particles 100 or 101 may be used effectively to increase the thermal conductivity and lubricating properties of the oil.

Coated diamond particles 100 or 101 may also be used for polishing. Diamond crystals have properties that may be beneficial for polishing, such as hardness, thermal conductivity, and durability, but poor wettability may cause uncoated crystals to settle. Functionalized graphene coatings may increase wettability of diamond crystals in polishing liquids, promoting more uniform polishing.

Wettability may also be beneficial in polymers and elastomers. Polymers and elastomers may benefit from higher thermal conductivity of diamond grains. Diamond grains tend to settle quickly from uncured polymers and elastomers, making it difficult to form a cured product containing a generally uniform distribution of the diamond grains. Functionalized graphene-coated diamond grains, on the other hand, may remain in suspension while the polymer or elastomer cures, resulting in a solid with diamond grains dispersed uniformly throughout. The thermal conductivity, mechanical strength, and electrical conductivity of the polymer or elastomer may be increased through the addition of graphene-coated diamond particles.

Diamond grains may be used to form cutting elements. For example, as discussed with reference to FIG. 5 below, polycrystalline compacts may be formed by sintering hard polycrystalline materials, including diamond grains having graphene coatings. To aid bonding of diamond grains in the sintering process, catalysts or other materials may be added among the grains. Coated diamond particles may be used in the formation of polycrystalline compacts. In some embodiments, the coated diamond particles comprise one or more additional layers of materials other than graphene for use in a sintering process.

Figure 3:
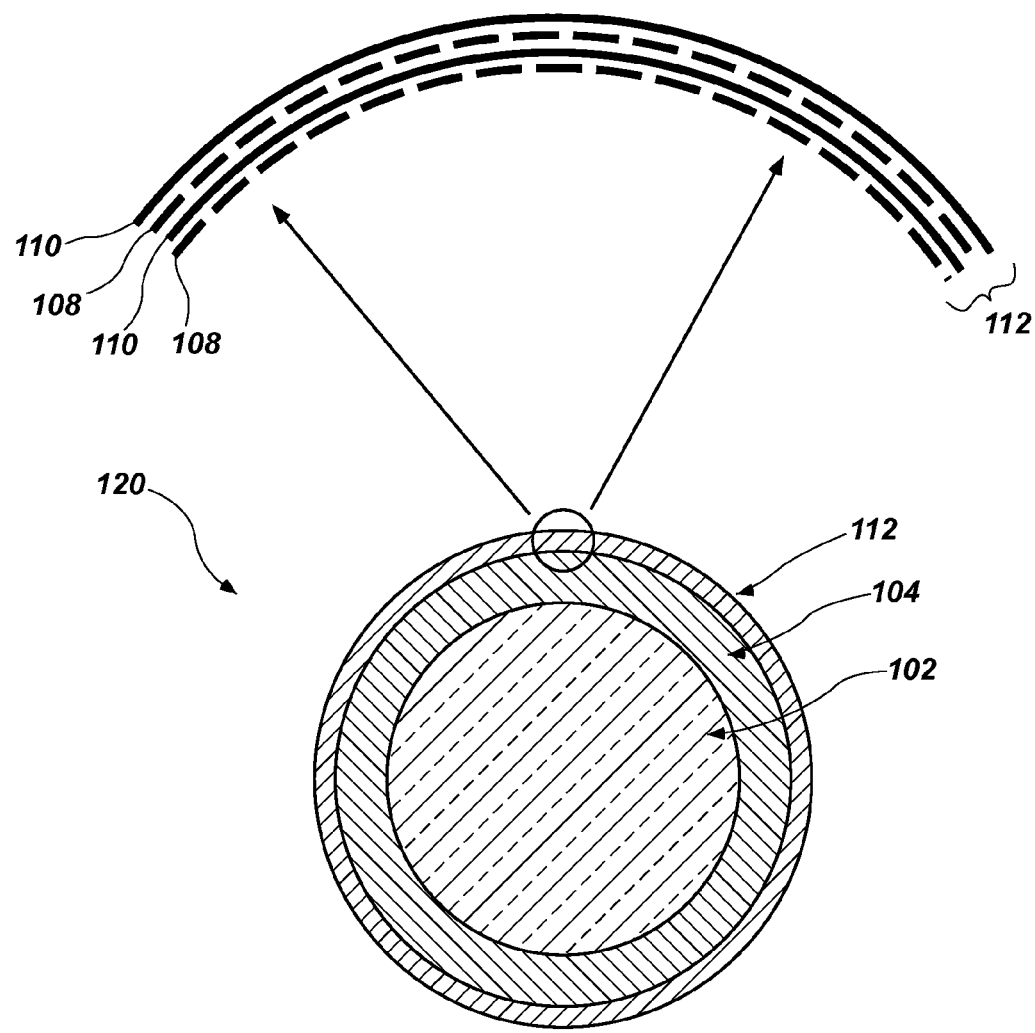
Figure 4:
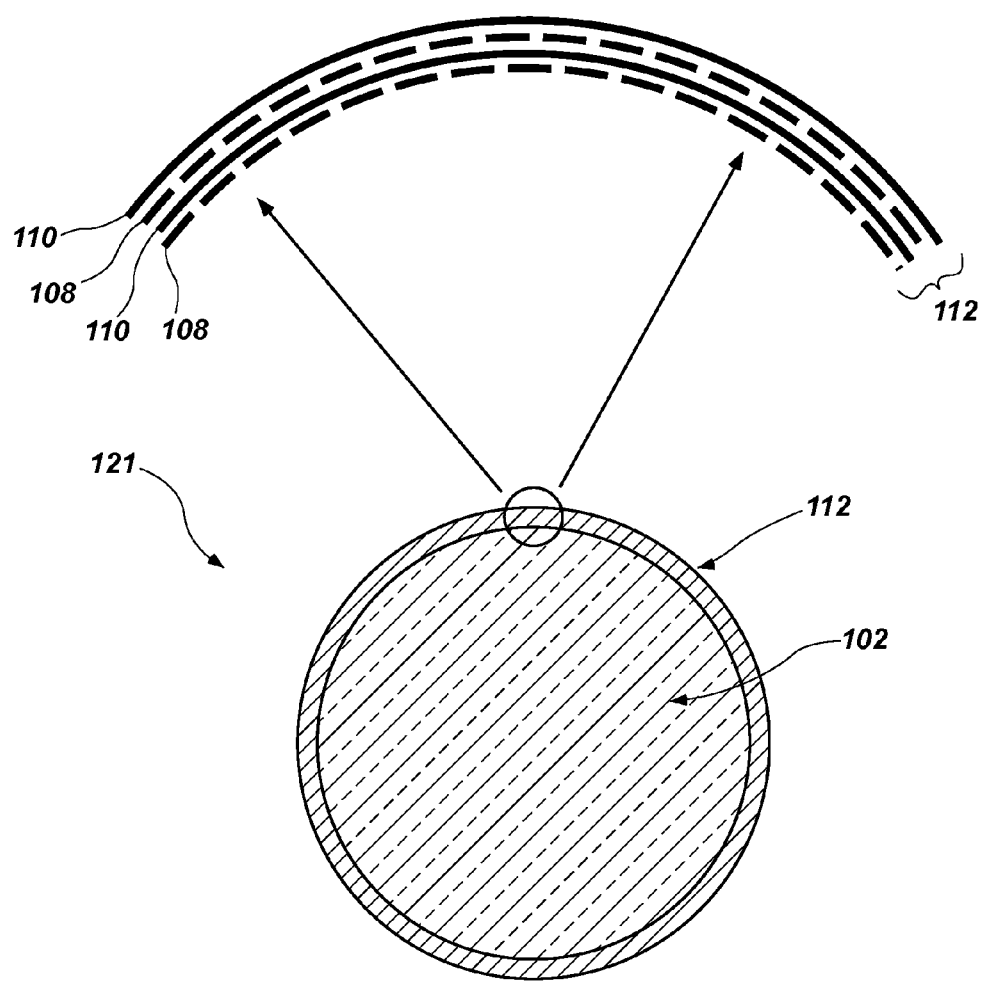

FIG. 3 is a simplified cross-section of an embodiment of a coated diamond particle 120 comprising at least one additional layer 110. Coated diamond particle 120 may, like the coated diamond particle 100 shown in FIG. 1, have a core 102 and a carbon shell 104. The carbon shell 104 may optionally be omitted, as in coated diamond particle 121, shown in FIG. 4. Coated diamond particle 120 or 121 may further comprise an outer layer 112 having one or more graphene layers 108 and one or more additional layers 110. The outer layer 112 of the coated diamond particle 120 or 121 may comprise alternating graphene layers 108 and additional layers 110. In some embodiments, the additional layers 110 may comprise materials that are catalytic or partially catalytic to diamond synthesis. For example, an additional layer 110 may comprise a Group VIII A element (e.g., iron, cobalt, or nickel) or an alloy thereof. In additional embodiments, the additional layer 110 may comprise a carbonate material, such as a carbonate of one or more of magnesium, calcium, strontium, and barium. The additional layer 110 may comprise other high-temperature/high-pressure nonmetallic diamond catalysts, such as silicon. In certain embodiments, an additional layer 110 may be a high-pressure-activated catalyst such as magnesium carbonate. In various embodiments, an additional layer 110 may be a protective coating of ceramic or refractory metal. Some additional layers 110 may enhance sustainability of the coated diamond particles 120 or 121 in a sintering cycle so that coated diamond particles 120 or 121 may remain in their initial state or participate in the HPHT reaction at a later processing stage.

The outer layer 112 of the coated diamond particle 120 may be formed over the carbon shell 104. In embodiments of coated diamond particles 121 without a carbon shell 104, the outer layer may be formed directly over the core 102. The first layer of the outer layer 112 (i.e., the layer with the smallest inside diameter) may be a graphene layer 108 or an additional layer 110, and may be formed over the core 102 or carbon shell 104. Each successive layer 108 or 110 may be formed over a previously formed layer 108 or 110. Before forming each graphene layer 108 or additional layer 110 over the coated diamond particle 120 or 121, the coated diamond particle 120 or 121 may be chemically modified by coating it with a charged species, such as those described with reference to the coated diamond particle 100 of FIG. 1. The coated diamond particle 120 or 121 may then be immersed in a solution containing an oppositely charged species. Multiple graphene layers 108 and/or multiple additional layers 110 may be formed such that the coated diamond particle 120 or 121 exhibits a selected physical property, such as diameter, thickness of outer layer 112, electrical conductivity, thermal conductivity, mechanical strength, coefficient of thermal expansion, wettability, mass, geometry surface energy, specific surface area, etc. Functionalized graphene-coated diamond grains may mix more fully with micron diamond. Furthermore, graphene layers 108 may provide a source of carbon to aid the sintering process.

Additional layers 110 may be formed by depositing, growing, or otherwise providing a layer of material. The particular process used to deposit each additional layer 110 may depend upon the particular material composition of that additional layer 110, the composition of the material over which it is formed, the geometry of the material over which it is formed, etc. Many suitable processes for depositing such layers are known in the art including, for example, wet chemistry processes (e.g., dip coating, solid-gel processes, etc.), physical deposition processes (e.g., PVD) and chemical deposition processes (e.g., CVD, ALD, etc.). In some embodiments, the additional layer 110 may be formed in a fluidized bed reactor.

In some embodiments, the graphene layers 108 may alternate with the additional layers 110. That is, a graphene layer 108 may be formed over the core 102 or carbon shell 104, and an additional layer 110 may be formed over the graphene layer 108. A second graphene layer 108 may be formed over the additional layer 110, and a second additional layer 110 may be formed over the second graphene layer 108. This sequence may continue for any number of layers.

Alternatively, an additional layer 110 may be formed over the core 102 or carbon shell 104, and a graphene layer 108 may be formed over the additional layer 110. A second additional layer 110 may be formed over the graphene layer 108, and a second graphene layer 108 may be formed over the second additional layer 110. This sequence, too, may continue for any number of layers.

In other embodiments, multiple graphene layers 108 may be formed sequentially, with additional layers 110 interspersed in patterns other than alternating. For example, two, three, four, etc., graphene layers 108 may be formed over the core 102 or carbon shell 104, followed by an additional layer 110. Two, three, four, etc., additional graphene layers 108 may be formed, followed by another additional layer 110. The sequence may continue for any number of layers.

As an additional example, two, three, four, etc., additional layers 110 may be formed over the core 102 or carbon shell 104, followed by a graphene layer 108. Two, three, four, etc., additional layers 110 may be formed, followed by another graphene layer 108. The sequence may continue for any number of layers.

Similarly, two, three, four, etc., additional layers 110 may be formed over the core 102 or carbon shell 104, followed by two, three, four, etc., graphene layers 108. Two, three, four, etc., additional layers 110 may be formed, followed by another two, three, four, etc., graphene layers 108. The sequence may continue for any number of layers, and the sequence may begin with graphene layers 108 instead of additional layers 110. Furthermore, the number of each type of layer need not form any recognizable pattern. For example, a single graphene layer 108 could be formed over the core 102 or carbon shell 104, and two, three, four, etc., additional layers 110 could be formed over the graphene layer 108. Two, three, four, etc., additional graphene layers 108 could be formed over the two, three, four, etc., additional layers 110. A single additional layer 110 could be formed over the two, three, four, etc., additional graphene layers 108.

Additional layers 110 need not have the same composition as other additional layers 110. In certain embodiments, two or more additional layers 110 have distinct compositions. For example, a first additional layer 110 may comprise a metal such as cobalt, iron, nickel, or an alloy thereof. A second additional layer 110 may be a high-pressure-activated catalyst such as magnesium carbonate. A third additional layer 110 may be a protective layer of ceramic (e.g., carbides, oxides, etc.) or refractory metal (e.g., Nb, Ta, Mo, W, Re, Ti, V, Cr, etc.). In other embodiments, a first additional layer 110 and a second additional layer 110 may comprise the same materials, but the materials may have different concentrations in each additional layer 110. In short, layers 108 and 110 may be arranged in any combination, configuration, or order, and additional layers 110 may have compositions identical to or different from other additional layers 110 within the outer layer 112.

Due to diamond grains' high strength, the availability of a carbon source in graphene layers 108, and the processing benefits of additional layers 110, coated diamond particles 120 or 121 may be particularly advantageous in the production of cutting elements of earth-boring tools.

Figure 5:
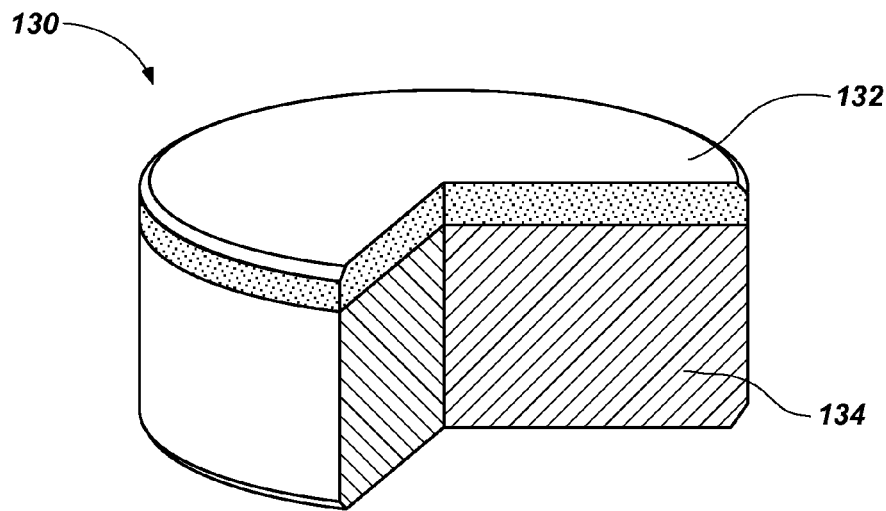
FIG. 5 illustrates an embodiment of a polycrystalline diamond compact.

FIG. 5 is a simplified drawing illustrating an embodiment of a polycrystalline compact 130 of the present disclosure that may be formed from graphene-coated diamond particles 100, 101, 120, and/or 121. The polycrystalline compact 130 includes a table or layer of hard polycrystalline material 132 that has been provided on (e.g., formed on or secured to) a surface of a supporting substrate 134. In additional embodiments, the polycrystalline compact 130 may simply comprise a volume of the hard polycrystalline material 132 having any desirable shape. The hard polycrystalline material 132 may be formed from coated diamond particles 100, 101, 120, and/or 121, described above with reference to FIGS. 1 through 4.

Figure 6:
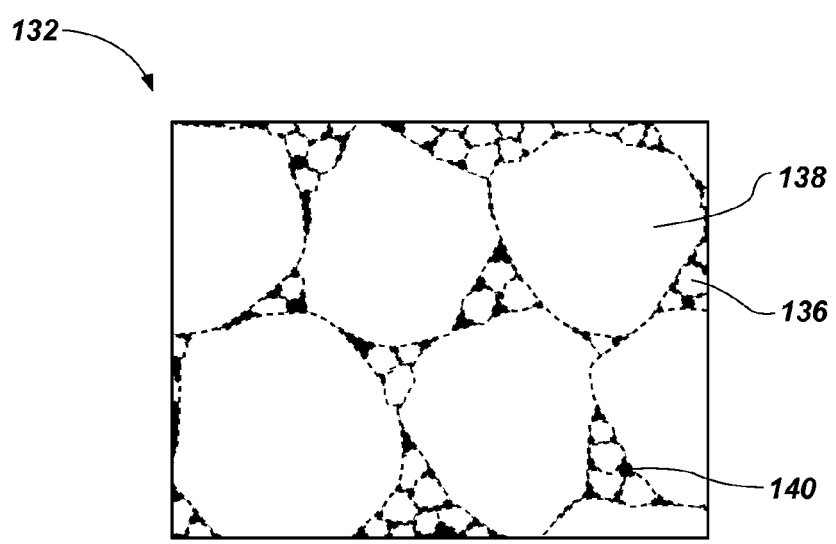
FIG. 6 is a simplified drawing showing how polycrystalline material of the polycrystalline diamond compact of FIG. 5 may appear under magnification, and illustrates inter-bonded larger and smaller grains of hard material.

FIG. 6 is an enlarged, schematic view illustrating how a microstructure of the hard polycrystalline material 132 of the polycrystalline compact 130 may appear under magnification. As shown in FIG. 6, the grains of the hard polycrystalline material 132 may have a multimodal (e.g., a bimodal, a trimodal, etc.) grain size distribution. In other embodiments (not shown), the grain size distribution may be monomodal. In multimodal grain size distributions, the hard polycrystalline material 132 may include a first plurality of grains 136 of hard material having a first average grain size, and at least a second plurality of grains 138 of hard material having a second average grain size that differs from the first average grain size of the first plurality of grains 136. In some embodiments, the hard polycrystalline material 132 may include a third plurality of grains (not shown) of hard material, a fourth plurality of grains (not shown) of hard material, etc. Polycrystalline compacts formed from multimodal distributions of grains are described more fully in U.S. Patent Application Publication No. 2011/0031034 A1, titled "Polycrystalline Compacts Including In-Situ Nucleated Grains, Earth-Boring Tools Including Such Compacts, and Methods of Forming Such Compacts and Tools," published Feb. 10, 2011, and in U.S. patent application Ser. No. 13/208,989, now U.S. Pat. No. 8,985,248, issued Mar. 24, 2015, titled "Cutting Elements Including Nanoparticles in at Least One Portion Thereof, Earth Boring Tools Including Such Cutting Elements, and Related Methods," filed Aug. 12, 2011, the disclosure of each of which is incorporated herein in its entirety by this reference. Embodiments described therein may be practiced using the coated diamond particles 100, 101, 120, and/or 121. As a non-limiting example, a PDC cutting element may have two or more layers, and each layer may comprise one or more of coated diamond particles 100, 101, 120, and/or 121. In such embodiments, the two or more layers may comprise coated diamond particles 100, 101, 120, and/or 121 of differing sizes and/or compositions.

In the examples that follow, though only two pluralities of grains 136 and 138 are discussed, additional pluralities of grains may be used. As one example, the first plurality of grains 136 may be formed from coated diamond particles 120 or 121 formed from nanodiamond cores 102, and the second plurality of grains 138 may be formed from coated diamond particles 120 or 121 formed from micron diamond cores 102. Thus, the first plurality of grains 136 may be formed from nanoparticles used to form the microstructure of the hard polycrystalline material 132.

A large difference between the average grain size of the first plurality of grains 136 and the average grain size of the second plurality of grains 138 may result in smaller interstitial spaces or voids within the microstructure of the hard polycrystalline material 132 (relative to conventional polycrystalline materials), and the total volume of the interstitial spaces or voids may be more evenly distributed throughout the microstructure of the hard polycrystalline material 132 (relative to conventional polycrystalline materials). As a result, any material that might be present within the interstitial spaces (such as material of additional layers 110 formed over nanodiamond cores 102) may also be more evenly distributed throughout the microstructure of the hard polycrystalline material 132 within the relatively smaller interstitial spaces therein.

In some embodiments, the hard polycrystalline material 132 may include a catalyst material 140 (shaded black in FIG. 6) disposed in interstitial spaces between the first plurality of grains 136 and the second plurality of grains 138. The catalyst material 140 may comprise a catalyst capable of forming (and used to catalyze the formation of) inter-granular bonds between the first plurality of grains 136 and the second plurality of grains 138 of the hard polycrystalline material 132. In other embodiments, however, the interstitial spaces between the first plurality of grains 136 and the second plurality of grains 138 in some regions of the hard polycrystalline material 132, or throughout the entire volume of the hard polycrystalline material 132, may be at least substantially free of such a catalyst material 140. In such embodiments, the interstitial spaces may comprise voids filled with gas (e.g., air), or the interstitial spaces may be filled with another material that is not a catalyst material and that will not contribute to degradation of the polycrystalline material 132 when the compact 130 is used in a drilling operation.

The catalyst material may be formed of materials that may be included in one or more additional layers 110. For example, the catalyst material 140 may comprise a Group VIII A element or an alloy thereof, and the catalyst material 140 may comprise between about 0.1% and about 20% by volume of the hard polycrystalline material 132. In additional embodiments, the catalyst material 140 may comprise a carbonate material, such as a carbonate of one or more of magnesium, calcium, strontium, and barium. Carbonates may also be used to catalyze the formation of polycrystalline diamond.

The hard polycrystalline material 132 of the compact 130 may be formed using an HTHP process. Such processes, and systems for carrying out such processes, are generally known in the art and not described in detail herein. In accordance with some embodiments of the present disclosure, the first plurality of grains 136 may be nucleated in situ during the HTHP process used to form the hard polycrystalline material 132, as described in U.S. Patent Application Publication No. 2011/0031034 A1, previously incorporated by reference. In embodiments in which the first plurality of grains 136 is formed from coated diamond particles 100, 101, 120, and/or 121, graphene layers 108 may act as carbon-rich centers, and, optionally, additional layers 110 may catalyze in situ diamond formation during HTHP processing.

In some embodiments, the hard polycrystalline material 132 may be formed over a supporting substrate 134 (as shown in FIG. 5) of cemented tungsten carbide or another suitable substrate material in a conventional HTHP process of the type described, by way of non-limiting example, in U.S. Pat. No. 3,745,623, titled "Diamond Tools for Machining," issued Jul. 17, 1973, or may be formed as a freestanding polycrystalline compact (i.e., without the supporting substrate 134) in a similar conventional HTHP process as described, by way of non-limiting example, in U.S. Pat. No. 5,127,923, titled "Composite Abrasive Compact Having High Thermal Stability," issued Jul. 7, 1992, the disclosure of each of which is incorporated herein in its entirety by this reference. In some embodiments, the catalyst material 140 may be supplied from the supporting substrate 134 during an HTHP process used to form the hard polycrystalline material 132. For example, the substrate 134 may comprise a cobalt-cemented tungsten carbide material. The cobalt of the cobalt-cemented tungsten carbide may serve as the catalyst material 140 during the HTHP process. In some embodiments, the catalyst material 140 may be supplied by one or more additional layers 110 of coated diamond particles 120 or 121. In other words, one or more additional layers 110 of coated diamond particles 120 or 121 may comprise the catalyst material 140.

To form the hard polycrystalline material 132 in an HTHP process, a particulate mixture comprising grains of hard material, such as coated diamond particles 100, 101, 120, and/or 121, described with reference to FIGS. 1 through 4, may be subjected to elevated temperatures (e.g., temperatures greater than about 1,000° C.) and elevated pressures (e.g., pressures greater than about 5.0 gigapascals (GPa)) to form inter-granular bonds between the particles, thereby forming the hard polycrystalline material 132. Coated diamond particles 100, 101, 120, and/or 121 may provide graphene layers 108 as a source of carbon, which may promote enhanced sintering of diamond-to-diamond bonds. Coated diamond particles 100, 101, 120, and/or 121 may be used in conjunction with the methods described in U.S. Patent Application Publication No. 2011/0031034 A1, previously incorporated by reference. Specifically, various non-diamond nanoparticles may act as a source for diamond nucleation in situ under the appropriate sintering conditions. In some embodiments, the particulate mixture may be subjected to a pressure greater than about six gigapascals (6.0 GPa) and a temperature greater than about 1,500° C. in the HTHP process.

The overall polycrystalline microstructure that may be achieved in accordance with embodiments of the present disclosure may result in polycrystalline diamond compacts that exhibit improved durability, conductivity, and/or thermal stability.

Figure 7:
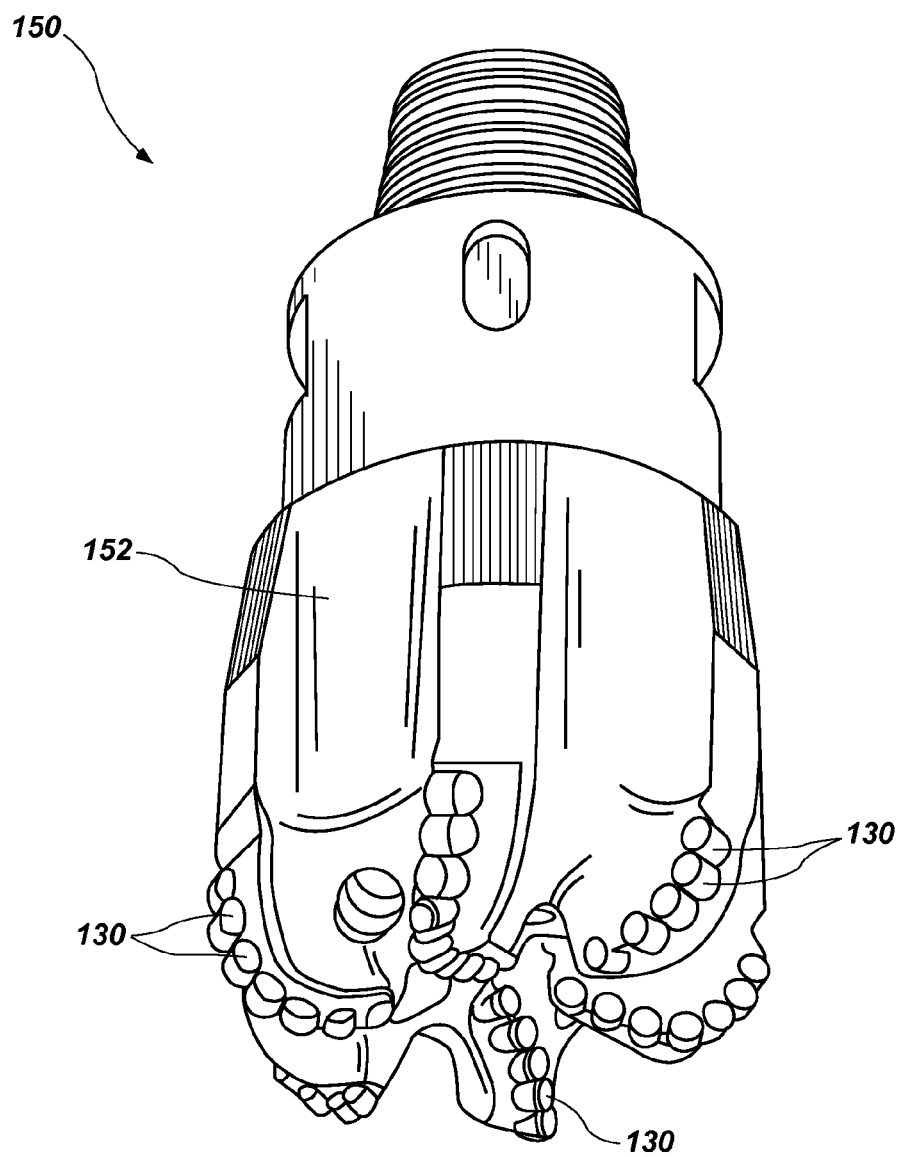
FIG. 7 is a perspective view of an embodiment of a fixed-cutter earth-boring rotary drill bit that includes a plurality of polycrystalline diamond compacts like that shown in FIG. 5.

Polycrystalline compacts that embody teachings of the present disclosure, such as the polycrystalline compact 130 illustrated in FIG. 5, may be formed and secured to drill bits for use in forming wellbores in subterranean formations. As a non-limiting example, FIG. 7 illustrates a fixed-cutter type earth-boring rotary drill bit 150 that includes a plurality of polycrystalline compacts 130 as previously described herein. The rotary drill bit 150 includes a bit body 152, and the polycrystalline compacts 130, which serve as cutting elements, are bonded to the bit body 152. The polycrystalline compacts 130 may be brazed or otherwise secured within pockets formed in the outer surface of the bit body 152. Polycrystalline compacts that embody teachings of the present disclosure may be formed and secured to any other type of earth-boring tool for use in forming wellbores in subterranean formations.

Additional non-limiting example embodiments of the disclosure are described below.

Embodiment 1

A coated diamond particle comprising a solid core comprising diamond, and at least one graphene layer over at least a portion of the solid core.

Embodiment 2

The coated diamond particle of Embodiment 1, further comprising at least one additional layer formed over at least a portion of the solid core.

Embodiment 3

The coated diamond particle of Embodiment 2, wherein the at least one graphene layer comprises two or more graphene layers separated by the at least one additional layer.

Embodiment 4

The coated diamond particle of Embodiment 2, wherein the at least one additional layer comprises two or more additional layers separated by the at least one graphene layer.

Embodiment 5

The coated diamond particle of any of Embodiment 1 through Embodiment 4, further comprising a carbon shell.

Embodiment 6

The coated diamond particle of any of Embodiment 1 through Embodiment 5, wherein the coated diamond particle has a diameter of about 500 nm or less.

Embodiment 7

A method of forming a coated diamond particle, comprising coating a diamond particle with a charged species and coating the diamond particle with a graphene layer.

Embodiment 8

The method of Embodiment 7, further comprising coating the diamond particle with a material selected from the group consisting of group VIII A elements and alloys thereof.

Embodiment 9

The method of Embodiment 7, further comprising immersing the diamond particle in a solution comprising an oppositely charged species before coating the diamond particle with a graphene layer.

Embodiment 10

A composition comprising a substance and a plurality of coated diamond particles dispersed within the substance. Each coated diamond particle has a diamond core and at least one graphene layer formed over at least a portion of the diamond core.

Embodiment 11

The composition of Embodiment 10, wherein the substance comprises a fluid. The coated diamond particles are suspended in the fluid.

Embodiment 12

The composition of Embodiment 10, wherein the substance comprises a solid material. The coated diamond particles are dispersed throughout the solid material.

Embodiment 13

An intermediate structure including a hard polycrystalline material comprising a first plurality of diamond particles and a second plurality of diamond particles. At least one of the first plurality of diamond particles and the second plurality of diamond particles comprises a plurality of diamond particles having at least one graphene layer. The first plurality of diamond particles and the second plurality of diamond particles are interspersed.

Embodiment 14

The intermediate structure of Embodiment 13, wherein the first plurality of diamond particles has a first average diameter and the second plurality of diamond particles has a second average diameter different from the first average diameter.

Embodiment 15

The intermediate structure of Embodiment 13 or Embodiment 14, further comprising a catalyst material disposed in interstitial spaces between the first plurality of diamond particles and the second plurality of diamond particles.

Embodiment 16

The intermediate structure of any of Embodiment 13 through Embodiment 15, wherein at least one of the first plurality of diamond particles and the second plurality of diamond particles comprises a plurality of diamond particles having at least one layer comprising a material selected from the group consisting of cobalt, iron, nickel, and alloys thereof.

Embodiment 17

The intermediate structure of any of Embodiment 13 through Embodiment 16, wherein at least one of the first plurality of diamond particles and the second plurality of diamond particles comprises a plurality of diamond particles having at least one layer comprising magnesium carbonate.

Embodiment 18

The intermediate structure of any of Embodiment 13 through Embodiment 17, wherein at least one of the first plurality of diamond particles and the second plurality of diamond particles comprises a plurality of diamond particles having at least one layer comprising a material selected from the group consisting of ceramics and refractory metals.

Embodiment 19

The intermediate structure of any of Embodiment 13 through Embodiment 18, further comprising a first layer and a second layer. The first layer and the second layer each comprise a plurality of diamond particles having at least one graphene layer. The plurality of diamond particles of the first layer has a different average diameter from an average diameter of the plurality of diamond particles of the second layer.

Embodiment 20

A method of forming a polycrystalline compact, comprising coating each of a plurality of diamond particles with at least one graphene layer and catalyzing the formation of inter-granular bonds between adjacent particles of the plurality of diamond particles.

Embodiment 21

The method of Embodiment 20, further comprising coating each of the plurality of diamond particles with at least one additional layer.

The foregoing description is directed to particular embodiments for the purpose of illustration and explanation. It will be apparent to one skilled in the art that many modifications and changes to the embodiments set forth above are possible without departing from the scope of the embodiments disclosed herein as hereinafter claimed, including legal equivalents. It is intended that the following claims be interpreted to embrace all such modifications and changes.

What is claimed is:

1. A method of forming a graphene-coated diamond particle, comprising:
   coating a diamond particle with a charged species; and
   coating the diamond particle with a graphene layer.

2. The method of claim 1, further comprising coating the diamond particle with a material selected from the group consisting of group VIII-A elements and alloys thereof.

3. The method of claim 1, further comprising immersing the diamond particle in a solution comprising an oppositely charged species before coating the diamond particle with a graphene layer.

4. The method of claim 1, further comprising coating the diamond particle with at least one graphite layer, wherein coating the diamond particle with a charged species comprises coating the at least one graphite layer with the charged species.

5. The method of claim 4, wherein coating the diamond particle with a graphene layer comprises providing the graphene layer over at least a portion of the at least one graphite layer.

6. The method of claim 1, wherein coating the diamond particle with a charged species comprises coating the diamond particle with a positively charged amine-terminated group.

7. A method of forming a polycrystalline compact, comprising:
- coating each of a first plurality of diamond particles with a charged species;
- coating each of the first plurality of diamond particles with at least one graphene layer; and
- catalyzing the formation of inter-granular bonds between adjacent particles of the first plurality of diamond particles.

8. The method of claim 7, further comprising coating each of the first plurality of diamond particles with a material selected from the group consisting of group VIII-A elements and alloys thereof.

9. The method of claim 7, further comprising interspersing the first plurality of diamond particles with a second plurality of diamond particles, wherein the first plurality of diamond particles has a first average diameter and the second plurality of diamond particles has a second average diameter different from the first average diameter.

10. The method of claim 7, further comprising coating each of the first plurality of diamond particles with at least one graphite layer before coating each of the first plurality of diamond particles with a charged species, wherein coating each of the first plurality of diamond particles with at least one graphene layer comprises providing the at least one graphene layer over at least a portion of the at least one graphite layer.

* * * * *